US012646035B2

(12) United States Patent
Helvik et al.

(10) Patent No.: US 12,646,035 B2
(45) Date of Patent: Jun. 2, 2026

(54) TASK-EXPERIENCE DISCOVERY

(71) Applicant: MICROSOFT TECHNOLOGY LICENSING, LLC, Redmond, WA (US)

(72) Inventors: Torbjørn Helvik, Oslo (NO); Aleksander Torstensen, Nordre Follo (NO)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 259 days.

(21) Appl. No.: 18/325,261

(22) Filed: May 30, 2023

(65) Prior Publication Data

US 2024/0403829 A1     Dec. 5, 2024

(51) Int. Cl.
*G06Q 10/06*          (2023.01)
*G06Q 10/10*          (2023.01)
*G06Q 10/101*         (2023.01)

(52) U.S. Cl.
CPC .................................. *G06Q 10/103* (2013.01)

(58) Field of Classification Search
CPC ...................................................... G06Q 10/103
USPC ............................................ 705/1.1–912, 301
See application file for complete search history.

(56) References Cited

U.S. PATENT DOCUMENTS

2004/0267589 A1     12/2004  Wallman
2020/0272663 A1*     8/2020  Hewitt .................. H04L 65/403

2020/0409962 A1*    12/2020  Sarkis .................... G06Q 50/01
2021/0241231 A1*     8/2021  Mullins .......... G06Q 10/063118
2021/0328888 A1*    10/2021  Rath ................... H04L 41/5074
2022/0058564 A1      2/2022  Lee et al.

FOREIGN PATENT DOCUMENTS

KR          102028422 B1    10/2019
KR          20220080338 A    6/2022

OTHER PUBLICATIONS

Zhu J, Yaseen A. A Recommender for Research Collaborators Using Graph Neural Networks. Front Artif Intell. Aug. 1, 2022; 5: 881704. doi: 10.3389/frai.2022.881704. PMID: 35978654; PMCID: PMC9376356. (Year: 2022).*

(Continued)

*Primary Examiner* — Jonathan P Ouellette
(74) *Attorney, Agent, or Firm* — Shook Hardy & Bacon L.L.P.

(57)          ABSTRACT

The technology described herein identifies a user or user group with relevant experience for a yet to be completed task that is part of a project. The technology described herein improves on past efforts to identify users with relevant experience by considering the project context of an active task and a collaboration history of the user or user group. The technology builds a project-context oriented task description that includes the task description of the active task along with the task descriptions of other tasks within the project. The project-oriented task description is used to generate a vector embedding, which are used to identify similar tasks. Once a similar task is identified, the user or user group associated with the similar task are candidates to provide relevant experience. A collaboration network may be used to identify users who worked together previously on a task or project.

20 Claims, 8 Drawing Sheets

(56)            References Cited

OTHER PUBLICATIONS

T. Koopmann, K. Kobs, K. Herud and A. Hotho, "CoBERT: Scientific Collaboration Prediction via Sequential Recommendation," 2021 International Conference on Data Mining Workshops (ICDMW), Auckland, New Zealand, 2021, pp. 45-54, doi: 10.1109/ ICDMW53433.2021.00013. (Year: 2021).*
Deuja, Rojina, "Semantically Meaningful Sentence Embeddings", In Thesis of Computer Science and Engineering: Theses, Dissertations, and Student Research, Dec. 2, 2021, 90 Pages.

* cited by examiner

500

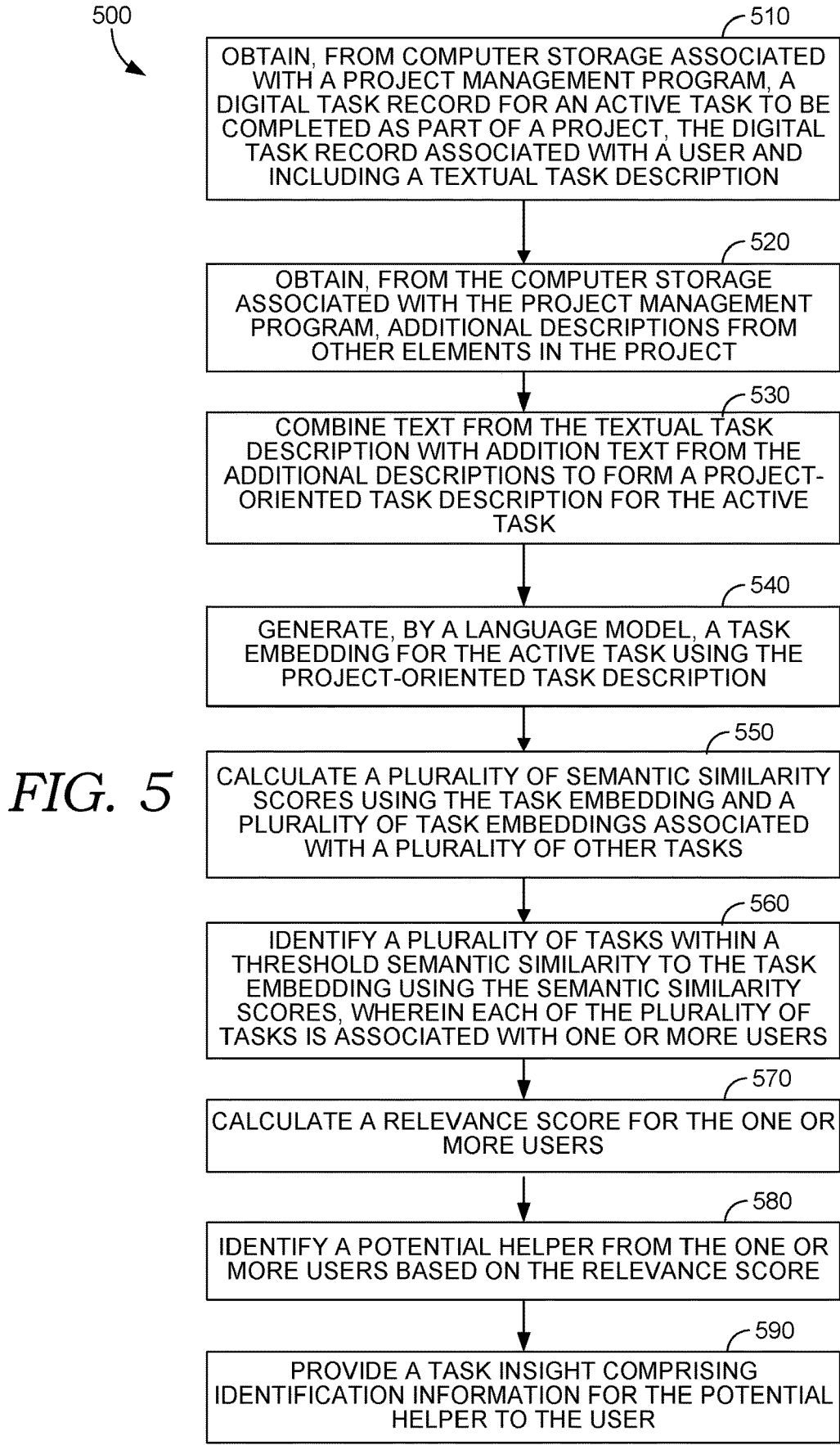

510

OBTAIN, FROM COMPUTER STORAGE ASSOCIATED WITH A PROJECT MANAGEMENT PROGRAM, A DIGITAL TASK RECORD FOR AN ACTIVE TASK TO BE COMPLETED AS PART OF A PROJECT, THE DIGITAL TASK RECORD ASSOCIATED WITH A USER AND INCLUDING A TEXTUAL TASK DESCRIPTION

520

OBTAIN, FROM THE COMPUTER STORAGE ASSOCIATED WITH THE PROJECT MANAGEMENT PROGRAM, ADDITIONAL DESCRIPTIONS FROM OTHER ELEMENTS IN THE PROJECT

530

COMBINE TEXT FROM THE TEXTUAL TASK DESCRIPTION WITH ADDITION TEXT FROM THE ADDITIONAL DESCRIPTIONS TO FORM A PROJECT-ORIENTED TASK DESCRIPTION FOR THE ACTIVE TASK

540

GENERATE, BY A LANGUAGE MODEL, A TASK EMBEDDING FOR THE ACTIVE TASK USING THE PROJECT-ORIENTED TASK DESCRIPTION

CALCULATE A PLURALITY OF SEMANTIC SIMILARITY SCORES USING THE TASK EMBEDDING AND A PLURALITY OF TASK EMBEDDINGS ASSOCIATED WITH A PLURALITY OF OTHER TASKS

560

IDENTIFY A PLURALITY OF TASKS WITHIN A THRESHOLD SEMANTIC SIMILARITY TO THE TASK EMBEDDING USING THE SEMANTIC SIMILARITY SCORES, WHEREIN EACH OF THE PLURALITY OF TASKS IS ASSOCIATED WITH ONE OR MORE USERS

570

CALCULATE A RELEVANCE SCORE FOR THE ONE OR MORE USERS

580

IDENTIFY A POTENTIAL HELPER FROM THE ONE OR MORE USERS BASED ON THE RELEVANCE SCORE

590

PROVIDE A TASK INSIGHT COMPRISING IDENTIFICATION INFORMATION FOR THE POTENTIAL HELPER TO THE USER

600

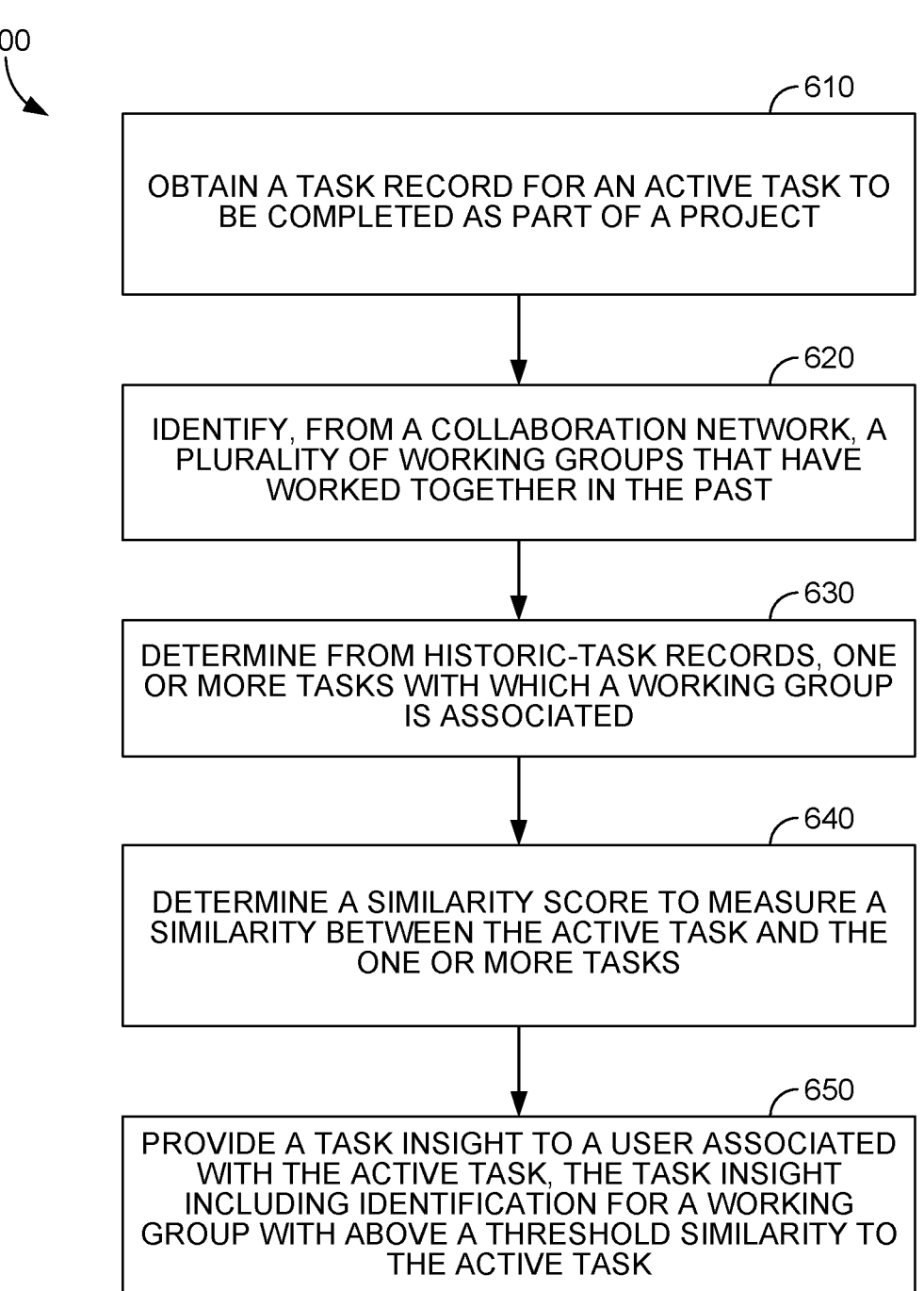

610

OBTAIN A TASK RECORD FOR AN ACTIVE TASK TO BE COMPLETED AS PART OF A PROJECT

620

IDENTIFY, FROM A COLLABORATION NETWORK, A PLURALITY OF WORKING GROUPS THAT HAVE WORKED TOGETHER IN THE PAST

630

DETERMINE FROM HISTORIC-TASK RECORDS, ONE OR MORE TASKS WITH WHICH A WORKING GROUP IS ASSOCIATED

640

DETERMINE A SIMILARITY SCORE TO MEASURE A SIMILARITY BETWEEN THE ACTIVE TASK AND THE ONE OR MORE TASKS

650

PROVIDE A TASK INSIGHT TO A USER ASSOCIATED WITH THE ACTIVE TASK, THE TASK INSIGHT INCLUDING IDENTIFICATION FOR A WORKING GROUP WITH ABOVE A THRESHOLD SIMILARITY TO THE ACTIVE TASK

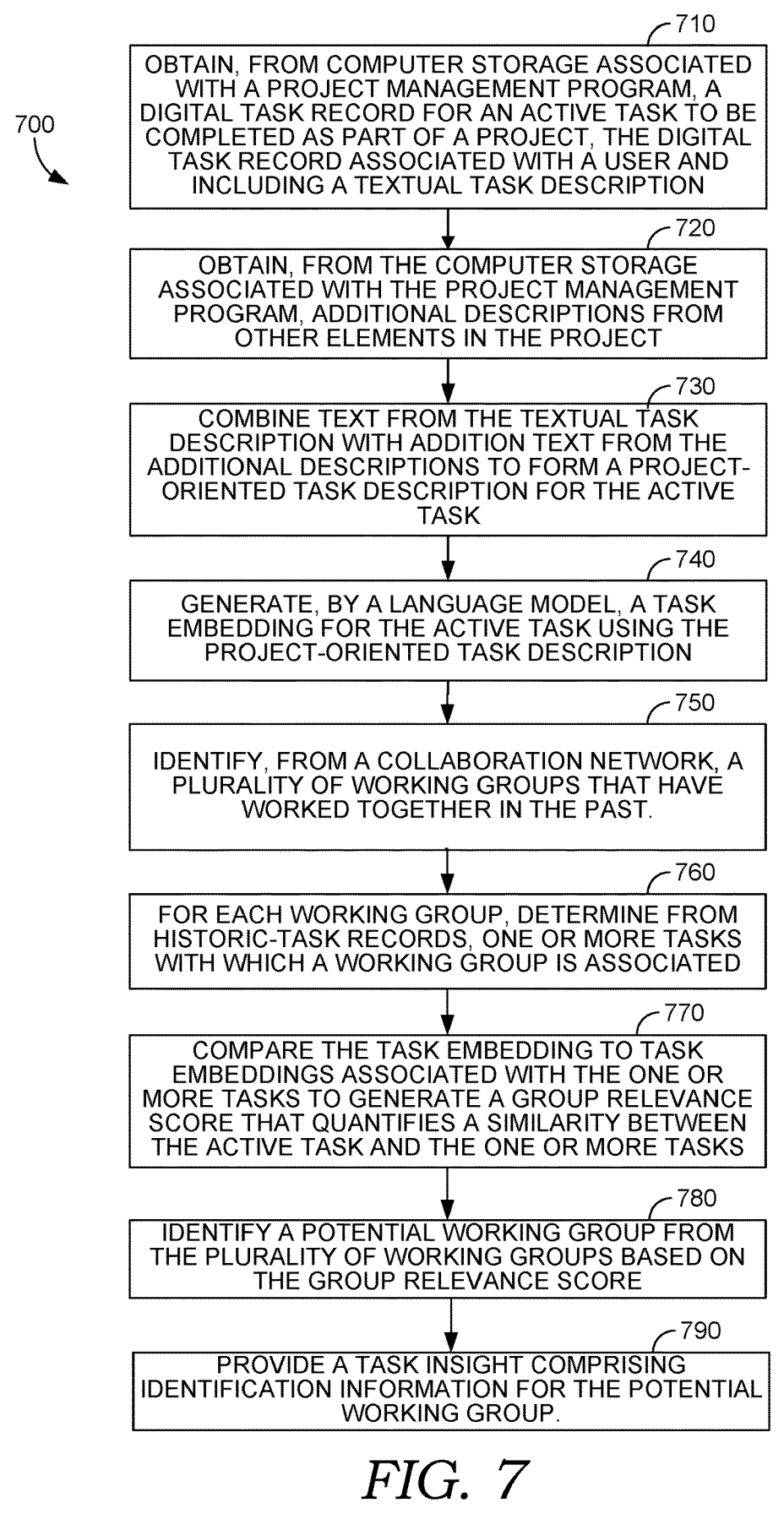

┌─ 710
OBTAIN, FROM COMPUTER STORAGE ASSOCIATED WITH A PROJECT MANAGEMENT PROGRAM, A DIGITAL TASK RECORD FOR AN ACTIVE TASK TO BE COMPLETED AS PART OF A PROJECT, THE DIGITAL TASK RECORD ASSOCIATED WITH A USER AND INCLUDING A TEXTUAL TASK DESCRIPTION

┌─ 720
OBTAIN, FROM THE COMPUTER STORAGE ASSOCIATED WITH THE PROJECT MANAGEMENT PROGRAM, ADDITIONAL DESCRIPTIONS FROM OTHER ELEMENTS IN THE PROJECT

┌─ 730
COMBINE TEXT FROM THE TEXTUAL TASK DESCRIPTION WITH ADDITION TEXT FROM THE ADDITIONAL DESCRIPTIONS TO FORM A PROJECT-ORIENTED TASK DESCRIPTION FOR THE ACTIVE TASK

┌─ 740
GENERATE, BY A LANGUAGE MODEL, A TASK EMBEDDING FOR THE ACTIVE TASK USING THE PROJECT-ORIENTED TASK DESCRIPTION

┌─ 750
IDENTIFY, FROM A COLLABORATION NETWORK, A PLURALITY OF WORKING GROUPS THAT HAVE WORKED TOGETHER IN THE PAST.

┌─ 760
FOR EACH WORKING GROUP, DETERMINE FROM HISTORIC-TASK RECORDS, ONE OR MORE TASKS WITH WHICH A WORKING GROUP IS ASSOCIATED

┌─ 770
COMPARE THE TASK EMBEDDING TO TASK EMBEDDINGS ASSOCIATED WITH THE ONE OR MORE TASKS TO GENERATE A GROUP RELEVANCE SCORE THAT QUANTIFIES A SIMILARITY BETWEEN THE ACTIVE TASK AND THE ONE OR MORE TASKS

┌─ 780
IDENTIFY A POTENTIAL WORKING GROUP FROM THE PLURALITY OF WORKING GROUPS BASED ON THE GROUP RELEVANCE SCORE

┌─ 790
PROVIDE A TASK INSIGHT COMPRISING IDENTIFICATION INFORMATION FOR THE POTENTIAL WORKING GROUP.

*FIG. 7*

TASK-EXPERIENCE DISCOVERY

BACKGROUND

As the number of tasks, meetings, electronic communications, documents, and other content an organization manages continues to increase, it becomes more difficult to identify potential collaborators with desired skills and experiences. For example, to locate a single collaborator or group of collaborators with expertise to help with a task or project, a user typically manually initiates searches for the person in a directory, document management system, or project records. This process is inefficient because it is a manual process. This process may also be inaccurate because the search systems may a lack proper project-context to surface the most relevant results.

Various directories may associate people with metadata indicating relevant experience. However, the metadata is often very general and does not indicate how fresh the experience is or whether the person is available to help with a project. The search results produced through various technologies may fail to consider the context of a potential collaborator's experience. For example, a search system may identify people with debugging experience, but fail to consider the specific software, code language, or other contextual factors that could be used to identify potential collaborators with the most relevant experience. Even with the search, however, the search results may still need to be viewed and/or analyzed to identify a particular person with relevant experience. For example, the user may need to open and review various documents to confirm that the potential collaborator worked on similar projects.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The technology described herein identifies a potential collaborator or group of potential collaborators with relevant experience for a yet to be completed task that is part of a project. The yet to be completed task may be described as an active task herein. The identified potential collaborator or group of potential collaborators may be provided to a user associated with the active task in the form of a task insight. The technology described herein improves on past efforts to identify potential collaborators with relevant experience by considering the project context of an active task and a collaboration history of the potential collaborator or group of potential collaborators.

In an aspect, the task insight (e.g., potential collaborator or group of potential collaborators with relevant experience) is automatically identified without a user submitting a query. The technology described herein compares an active task associated with a user to different tasks associated with one or more potential collaborators. A potential collaborator or group of potential collaborators that worked on similar tasks may be output through a project interface to the user in the form of a task insight. The potential collaborator or group of potential collaborators may be assigned the task by the user. Alternatively, the potential collaborator or group of potential collaborators may serve as a mentor or advisor to the user as the user completes the active task.

The technology described herein identifies similar tasks in the context of a project. In a typical project plan, a digital task record includes, among other features, a task description, to be completed date, a completed date, and an associated user or users. The task description is textual and often brief. The technology described herein makes use of the project context by building a project-context oriented task description. The project-oriented task description includes the task description of the active task along with additional descriptions for other elements in the project. The other elements may be other tasks, overall project descriptions, project titles, project goals, and the like. Various selection methodologies may be used to identify task descriptions to include within the project-oriented task description.

The project-oriented task description is used to generate an embedding, such as a vector embedding. In aspects, the vector embedding is generated using sentence embedding technology. The vector embedding for the active task may then be compared to the vector embedding of other tasks using a similarity parameter, such as cosine similarity. In an aspect, a nearest neighbor index is built that includes vector embeddings for tasks within a plurality of projects. Once a similar task is identified, the potential collaborator or group of potential collaborators associated with the similar task may be communicated to a user associated with the active task. Potential collaborator s who have completed similar tasks are likely to have experiences that may help with the active task.

A collaboration network may be used to identify potential collaborators who worked together previously on a task or project. The task-insight recommendation system may consider whether a potential collaborator with relevant experience has worked with the user associated with the active task. A potential collaborator who has worked with the user associated with the active task in the past may receive a higher relevance rank. Similarly, when the recommendation includes a group of potential collaborators, the recommendation may consider whether the group of potential collaborators has worked together in the past. An output from the collaboration network may include whether or not users have collaborated in the past as well as a strength of collaboration. The strength of collaboration may be determined based on the amount of collaboration incidence, the recency of collaboration, and other factors. The output may be described a collaboration network insight.

BRIEF DESCRIPTION OF THE DRAWINGS

The technology described herein is described in detail below with reference to the attached drawing figures, wherein:

FIG. 5 provides a first example method for facilitating generation of task insights, in accordance with aspects of the technology described herein;

FIG. 6 provides a second example method for facilitating generation of task insights, in accordance with aspects of the technology described herein;

FIG. 7 provides a third example method for facilitating generation of task insights, in accordance with aspects of the technology described herein.

DETAILED DESCRIPTION

Figure 1:
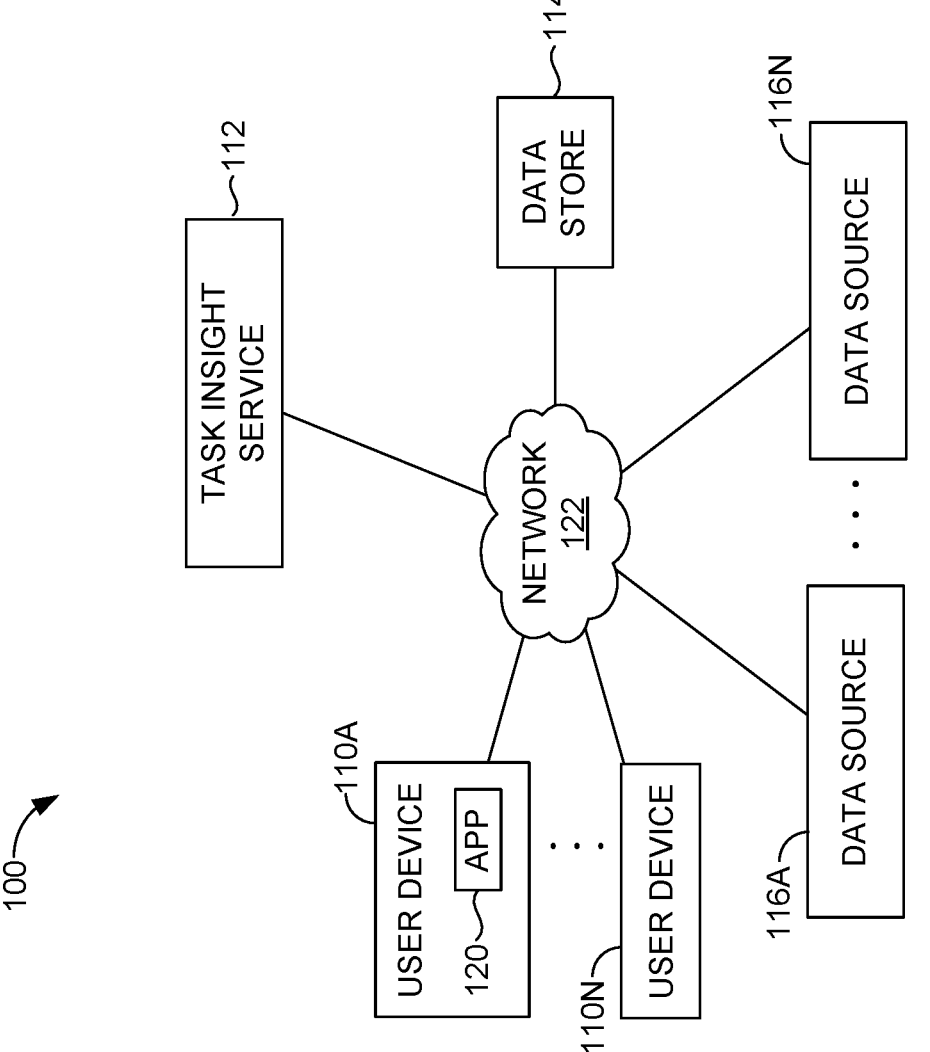
FIG. 1 is a block diagram of an example system for facilitating generation of task insights, suitable for use in implementing aspects of the technology described herein.

The technology described herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described.

Overview

The technology described herein identifies a potential collaborator or group of potential collaborators with relevant experience for a yet to be completed task that is part of a project. The yet to be completed task may be described as an active task herein. The identified potential collaborator or group of potential collaborators may be provided to a user associated with the active task in the form of a task insight. The task insight may identify the potential collaborator or group of potential collaborators, tasks the potential collaborator or group of potential collaborators have previously worked on, information (e.g., job title, office location, email, phone, years of experience) about the potential collaborators, and the like. The technology described herein improves on past efforts to identify collaborators with relevant experience by considering the project context of an active task and a collaboration history of the potential collaborator or group of potential collaborators. The project context includes detailed information about an active task that may not be found in the description of the active task itself. For example, an active task description may be "debug application." The project context may identify the software being debugged, the type of debugging technology used, the stage of software development at which the debugging is occurring, and other features that may be used to identify similar tasks. A collaboration history may be built using a collaboration network. The collaboration history may identify potential collaborators who previously worked together, which may be an indication that the potential collaborators are willing and/or able to work together in the future on the active task.

In an aspect, the task insight is automatically identified without a user submitting a query. The task insight identifies a potential collaborator or group of potential collaborators for an active task and may be output through a user interface. The task insight may include additional information about the potential collaborator or group of potential collaborators, including relevant tasks the collaborator(s) have worked on previously. Relevant tasks are tasks determined to be similar to the active task. To make a similarity determination, the technology described herein compares an active task associated with a user to different tasks associated with (e.g., performed by) one or more potential collaborators. A potential collaborator or group of potential collaborators that worked on similar tasks may be output through a project interface to the user in the form of a task insight. The potential collaborator or group of potential collaborators may be assigned the task by the user. Alternatively, the potential collaborator or group of potential collaborators may serve as a mentor or advisor to the user as the user completes the active task.

The technology described herein identifies similar tasks in the context of a project. A project is plan comprising a plurality of tasks completed to arrive at a particular goal or outcome. As used herein, the plurality of tasks have dependencies with each other within the plan. The dependencies relate tasks to each other and form a part of the project context. The technology described herein works with project-management software in which the project plan, including the plurality of tasks and the task dependencies are identified. A simple task list without dependencies, such as may be found in a calendar software, is not a project for the purpose of the technology described herein.

The dependencies may be time-sequence dependencies and or hierarchical-dependencies. A time sequence dependency indicates that a first task needs to be completed before a second task. For example, a pump (e.g., first task) needs to be ordered before it may be installed (e.g., second task). A hierarchical dependency is a sub task that is completed as part of completing a larger task. The hierarchical dependency is formed when a task is divided into one or more sub tasks that may or may not be time-sequence dependent. For example, the pump-installation task may include making an electrical connection, a fluid connection, and structural connection. In general, these three tasks may be completed in any order or competed simultaneously. Each of these three tasks may also be broken down into additional subtasks forming a multi-level hierarchy.

In a typical project plan, a digital task record includes, among other features, a task description, to be completed date, a completed date, and an associated user or users. The task description is textual and often brief. Using the pump installation example above, a task description may be "make electrical connection." If only this task description were used to identify relevant experience, the results may return tasks related to making electrical connections to machinery other than pumps, different kinds of pumps, different manufacturers of pumps, at different manufacturing facilities, among many other differences. Many of these results may not be very helpful. To better understand the active task, "make electrical connection," the project context of the task should be considered. Similarly, to understand whether other tasks are similar to the active task, the project context of those tasks should also be considered.

The technology described herein makes use of the project context by building a project-context oriented task description. The project-oriented task description includes the task description of the active task along with additional descriptions for other elements in the project. The other elements may be other tasks, overall project descriptions, project titles, project goals, and the like. Various selection methodologies may be used to identify task descriptions to include within the project-oriented task description. In general, task descriptions higher in the task hierarchy than the active task may be included. In an aspect, all task descriptions in the direct hierarchy above an active task are included within the project-oriented task description. In other aspects, task descriptions of tasks on the same hierarchical level as the active task may be included in the project-oriented text description. In another aspect, all second-level tasks within the project are included in the project-oriented task description.

The project-oriented task description is used to generate a vector embedding. In aspects, the vector embedding is generated using sentence embedding technology. The vector embedding for the active task may then be compared to the vector embedding of other tasks using a similarity parameter, such as cosine similarity. In an aspect, a nearest neighbor index is built that includes vector embeddings for tasks within a plurality of projects. The plurality of projects may be associated with an organization, such as a business.

A collaboration network may be used to identify people who worked together previously on a task or project. The task-insight recommendation system may consider whether a potential collaborator with relevant experience has worked with the user associated with the active task. A potential collaborator that has worked with the user associated with the active task in the past may receive a higher relevance rank. Similarly, when the recommendation includes a group of potential collaborators, the recommendation may consider whether the group of potential collaborators has worked together in the past. In aspects, a general collaboration network may be used or a project-oriented collaboration network may be used. A general collaboration network may identify people that work together previously, whether or not that work involved a project. A project-oriented collaboration network identifies people who worked together previously in the context of a project. An output from the collaboration network may include whether or not people have collaborated in the past as well as a strength of collaboration. The strength of collaboration may be determined based on the amount of collaboration incidence, the recency of collaboration, and other factors. The output may be described a collaboration network insight.

The technology described herein, provides a more accurate experience recommendation, which may save user time and computing resources. As obtaining desired information may be time-consuming and burdensome, particularly when multiple search iterations and/or task accesses are performed to locate relevant information, computing and network resources are unnecessarily consumed to facilitate the searches and task accesses. For instance, computer input/output (I/O) operations are unnecessarily multiplied in an effort to identify a relevant task. As one example, each time a query for a task "connect electricity," is initiated, the information must be searched for and located at a particular computer storage address of a storage device. The searching and locating of the relevant information is computationally expensive and increases latency. For instance, assume the requested data is located in a disk array. In such a case, the read/write head of the disk manually locates the correct disk and address. When such queries are repetitively issued, as is the case with these existing technologies, there is unnecessary wear placed on the read/write head as well as increased computer latency because of the number of times the disk is accessed via the read/write head. Similarly, such queries repeatedly issued against solid-state storage will consume the limited program/erase cycles of the storage, thereby increasing the likelihood of failure sooner than would otherwise occur. Further, when databases are accessed, processing queries consumes many computing resources, thereby decreasing throughput and increasing network latency. As such, the use of computer and network resources is increased due to the unnecessary quantity of queries executed and/or task accesses.

Additionally, such repetitive search operations may often result in packet generation costs that adversely affect computer network communication. Each time a user issues a query, for example, the contents or payload of the query is typically supplemented with header information or other metadata within a packet in TCP/IP and other protocol networks. Accordingly, when the number of queries increases to obtain desired data, as is the case with the existing technologies, there are throughput and network latency costs by repetitively generating this metadata and sending it over a computer network.

Accordingly, the technology described herein is directed to facilitating the generation, provision, and utilization of task experience recommendations in an efficient and effective manner. Advantageously, efficiencies of computing and network resources may be enhanced using implementations described herein. In particular, the task experience recommendations generating technology described herein provides for a more efficient use of computing resources (e.g., less packet generation costs and reduced I/O) than conventional methods of searching for task experience. For instance, the technology described herein enables a user seeking particular information to identify similar tasks and users that worked on those tasks, without requiring the user to access and/or download any additional information or interfaces. In this regard, the user may efficiently and effectively discover contextually relevant information associated with a task and therefore determine a relevance of a task, instead of repeatedly browsing various information looking for the desired information (e.g., opening and viewing various documents, project records), thereby resulting in unnecessary computing resources used to process multiple scroll inputs and/or multiple screen rendering updates.

Computationally, the technology described herein results in less I/O and, thus, less wear and tear on a read/write head, as well as reduced latency as the user does not have to access and/or download tasks to view in an effort to locate a desired task. There are also reduced network latency costs because fewer packets are being populated and sent over a computer network. Further, because less queries are issued to identify desired information, there are less query execution costs. As such, implementations described herein can conserve network resources and input/output operations of the user device, a data feed service, a document service, a communication service, etc.

A potential collaborator is a person that may be able to help a user with a task. The help provided may include performing the task or advising/mentoring the user in order to help the user with the task. Aspects may identify a group of potential collaborators, which may also be described herein as a working group. In an aspect, the scope of potential collaborators may be limited to persons associated with an enterprise of which the user is a part.

A task insight is information describing a potential collaborator or group of potential collaborators to help a user with the active task. The task insight may include additional information about the potential collaborator or group of potential collaborators, including relevant tasks the collaborator(s) have worked on previously, job title, availability, and the like. The task insight may be presented to the user through a user interface.

A task embedding is a numerical representation of the project-oriented task description generated by a language model. The numerical representation may take the form of a vector. The task embedding attempts to capture the semantic content of the text in the project-oriented task description, such that a meaning of the project-oriented task description is captured. If two project-oriented task descriptions express a similar idea using different words, their task embeddings should still be similar to each other.

The project-oriented task description is a textual description of a task that includes textual information taken from tasks that are part of the same project as the task. The textual information from other tasks provide context for the task. In other words, the project-oriented task description combines descriptive information taken from multiple tasks in a project to provide context information for a different task in the project.

Overview of Example Environments for Facilitating Generation of Task Insights

Referring initially to FIG. 1, a block diagram of an example network environment 100 suitable for use in implementing embodiments described herein is shown. Generally, the system 100 illustrates an environment suitable for facilitating management of task insights. Among other things, embodiments described herein efficiently and effectively generate and provide task insights, such as identification of a collaborator with expertise to help with a task. A task insight may also be previously completed task that is similar to an active task. In an aspect, the task insight may be a collaboration network insight, such as the identification of a group of potential collaborators that previously collaborated. A collaboration network generally refers to data or information related to a collaboration among individuals or entities. A collaboration network may include both the individuals/entities and tasks created by, modified by, viewed by, etc. such individuals/entities in the collaboration network. Advantageously, providing the task insights in an efficient manner enables a user to identify potential collaborators with expertise to help with a task without having to manually search for the potential collaborators using various systems and queries.

The network environment 100 includes a user device 110a-110n (referred to generally as user device(s) 110), a task insight service 112, a data store 114, and data sources 116A-116N (referred to generally as data source(s) 116). The user devices 110A-110N, the task insight service 112, the data store 114, and the data sources 116A-116N can communicate through a network 122, which may include any number of networks such as, for example, a local area network (LAN), a wide area network (WAN), the Internet, a cellular network, a peer-to-peer (P2P) network, a mobile network, or a combination of networks.

The network environment 100 shown in FIG. 1 is an example of one suitable network environment and is not intended to suggest any limitation as to the scope of use or functionality of embodiments disclosed throughout this document. Neither should the example network environment 100 be interpreted as having any dependency or requirement related to any single component or combination of components illustrated therein. For example, the user devices 110A-110N and data sources 116A-116N may be in communication with the task insight service 112 via a mobile network or the Internet, and the task insight service 112 may be in communication with data store 114 via a local area network. Further, although the environment 100 is illustrated with a network, one or more of the components may directly communicate with one another, for example, via HDMI (high-definition multimedia interface), and DVI (digital visual interface). Alternatively, one or more components may be integrated with one another, for example, at least a portion of the task insight service 112 and/or data store 114 may be integrated with the user device 110 and/or data sources 116. For instance, a portion of the task insight service 112 may be integrated with a server (e.g., of a data feed service) in communication with a user device, while another portion of the task insight service 112 may be integrated with the user device (e.g., via application 120).

The user device 110 may be any kind of computing device capable of facilitating determining and/or providing task insights. For example, in an embodiment, the user device 110 may be a computing device such as computing device 800, as described above with reference to FIG. 8. In embodiments, the user device 110 may be a personal computer (PC), a laptop computer, a workstation, a mobile computing device, a PDA, a cell phone, or the like.

The user device may include one or more processors, and one or more computer-readable media. The computer-readable media may include computer-readable instructions executable by the one or more processors. The instructions may be embodied by one or more applications, such as application 120 shown in FIG. 1. The application(s) may generally be any application capable of facilitating determining and/or providing task insight data. In some implementations, the application(s) comprises a web application, which may run in a web browser, and could be hosted at least partially server-side (e.g., via a data feed service, such as Microsoft® Feed). In addition, or instead, the application(s) may comprise a dedicated application. In some cases, the application is integrated into the operating system (e.g., as a service). As one specific example application, application 120 may be a tool that provides information associated with tasks, such as emails, instant messages, documents, etc.

User device 110 may be a client device on a client-side of operating environment 100, while task insight service 112 and data sources 116 may be on a server-side of operating environment 100. Task insight service 112 and/or data sources 116 may comprise server-side software designed to work in conjunction with client-side software on user device 110 so as to implement any combination of the features and functionalities discussed in the present disclosure. An example of such client-side software is application 120 on user device 110. The application 120 may be associated with a project-management software. Alternatively, the application 120 may be a browser through which a project-management interface is generated. This division of operating environment 100 is provided to illustrate one example of a suitable environment, and it is noted there is no requirement for each implementation that any combination of user device 110, task insight service 112, and/or data sources 116 to remain as separate entities.

In an embodiment, the user device 110 is separate and distinct from the task insight service 112, the data store 114, and the data sources 116 illustrated in FIG. 1. In another embodiment, the user device 110 is integrated with one or more illustrated components. For instance, the user device 110 may incorporate functionality described in relation to the task insight service 112. For clarity of explanation, embodiments are described herein in which the user device 110, the task insight service 112, the data store 114, and the data sources 116 are separate, while understanding that this may not be the case in various configurations contemplated.

As described, a user device, such as user device 110, may facilitate determining and/or providing task insights, such as collaboration network insights and/or task context insights. A user device 110, as described herein, is generally operated by an individual or entity associated with a task(s). In some cases, such an individual may be a contributor or creator of the task. In other cases, a user may be a viewer or recipient of a task, or enabled to access such a task. In some implementations, determination or provision of task insights may be initiated at the user device 110. For example, in some cases, a user may request a task insight(s) related to a task(s). As another example, a user may initiate an application, such as application 120, or an aspect associated therewith, and based on such an initiation, initiate identification and/or provision of a task insight. In other words, the application 120 may initiate generation of a task insight without an explicit user instruction.

Determining and/or providing task insights may be initiated and/or presented via an application 120 operating on the user device 110. In this regard, the user device 110, via an application 120, might allow a user to initiate a determination or presentation of task insights. The user device 110 may include any type of application and may be a stand-alone application, a mobile application, a web application, or the like. In some cases, the functionality described herein may be integrated directly with an application or may be an add-on, or plug-in, to an application. One example of an application that may be used to initiate and/or present task insights corresponds with a project management application (e.g., Microsoft® Project). Another example of an application that may be used to initiate and/or present task insights is a spreadsheet service, calendar application, communication application, document manager service, etc. These applications may be installed on the user device 110

Such determination and/or provision of task insights may be initiated at the user device 110 in any manner. For instance, upon accessing a particular application, a user may be presented with, or navigate to, options associated with task insights. As one example, a user may utilize the user device 110 to access a project. In association with a task in the project, a user may select to view task insights. For instance, a user may right click or hover over a portion of the task description and be presented with an option to view one or more task insights. In some cases, the user may select to view a task insight corresponding with a specific digital task record. For example, a user may hover over an indication of a task, resulting in a task insight being presented in association with the task. In other cases, determining and/or providing a task insight may be automatically performed based on other interactions. For example, in accordance with opening an application, or having an application in an active window, determining and/or providing a task insight may be automatically triggered. A task insight may be in any form, such as a text, an icon, an image, etc. Further, as described herein, a task insight may include any type of information related to the task. For instance, the task insight may include an email address or name of an individual included in a collaboration network associated with a task. In some cases, a task insight indicator may be presented to indicate that a task insight exists for a task. In such a case, selecting the task insight indicator, or portion thereof, may result in a task insight being presented via a display screen of the user device 110. As described herein, the task insight may be presented to a user in the any number of formats, such as a card. In aspects, task insights are not generated for tasks that are not marked as complete and are only generated for active tasks, which are yet to be completed.

The user device 110 may communicate with the task insight service 112 to initiate determination of task insights and/or obtain task insights. In embodiments, for example, a user may utilize the user device 110 to initiate a determination of task insights via the network 122. For instance, in some embodiments, the network 122 might be the Internet, and the user device 110 interacts with the task insight service 112 (e.g., directly or via another service, such as a project management service, communication service, and/or docu-ment service) to initiate generation of task insights. In other embodiments, for example, the network 122 might be an enterprise network associated with an organization. It should be apparent to those having skill in the relevant arts that any number of other implementation scenarios may be possible as well.

With continued reference to FIG. 1, the task insight service 112 may be implemented as server systems, program modules, virtual machines, components of a server or servers, networks, and the like. At a high level, the task insight service 112 manages determining and providing task insights, such as collaboration network insights and/or project-context insights. In particular, the task insight service 112 may obtain insight requests. For instance, in some cases, a user device may provide an insight request. In other cases, another service, such as a data feed service, project service, communication service, and/or document service may provide an insight request. An insight request generally indicates a request for one or more task insights. Based on an insight request, the task insight service 112 may determine task insights, for example, using data sources 116. Data sources 116A-116N may be any type of source containing data. For example, data sources may be associated with collaboration network data, task data, project data, etc.

As described, in some cases, the task insight service 112 may receive insight requests for determining task insights via the user device 110 (or other device). Insight requests generally refer to any request or indication to determine and/or provide task insights, such as the identification of potential collaborators with experience relevant to completing an active task. Alternatively or additionally, insight requests may be provided by another service, such as a data feed service, a communication service, a project management service, a document service, or other service that provides tasks to a user device or that obtains task insights and incorporates such insights into information provided to a user device(s). Insight requests, for example, received from a device, such as user device 110, may include an indication of a task for which a task insight is desired. The indication may also include a project associated with task. By way of example only, an insight request may include a task identifier indicating a particular task for which a task insight is desired.

In accordance with receiving an insight request(s) (e.g., via the user device 110 or other service), the task insight service 112 may determine one or more task insights. In this regard, the task insight service 112 may determine collaboration network insights and/or task content insights, depending on the implementation. To determine such insights, in some embodiments, the task insight service 112 communicates with a data source(s), such as data source 116. Although illustrated as separate data sources, the data sources may be part of the task insight service. Further any number of data sources may be used. Data source 116 may additionally or alternatively be external or third-party services, servers, data stores, or other components having data. Data sources 116A-116N may be any type of source containing data. For example, data sources may be associated with collaboration network data, task data, etc. The data sources 116A-116N may include project records or completed and ongoing projects. As one example, one data source may include collaboration network data, another data source may include document data, another data source may include email data, another data source may include instant messaging data, and so forth. Generally, the task insight service 112 may determine task insights using any number of devices. As such, the task insight service 112 may determine task insights using various sources, such as data sources 116A-116N and data store 114. In this regard, the task insight service 112 may retrieve or receive data collected or identified at various components, or sensors associated therewith.

Advantageously, utilizing implementations described herein enable generation of task insights to be performed in an efficient manner. Further, the generated task insights may dynamically adapt to align with information determined as desired by the user and/or in real-time to the user. As such, a user may view desired and up-to-date information and may seamlessly assess the information.

Figure 2:
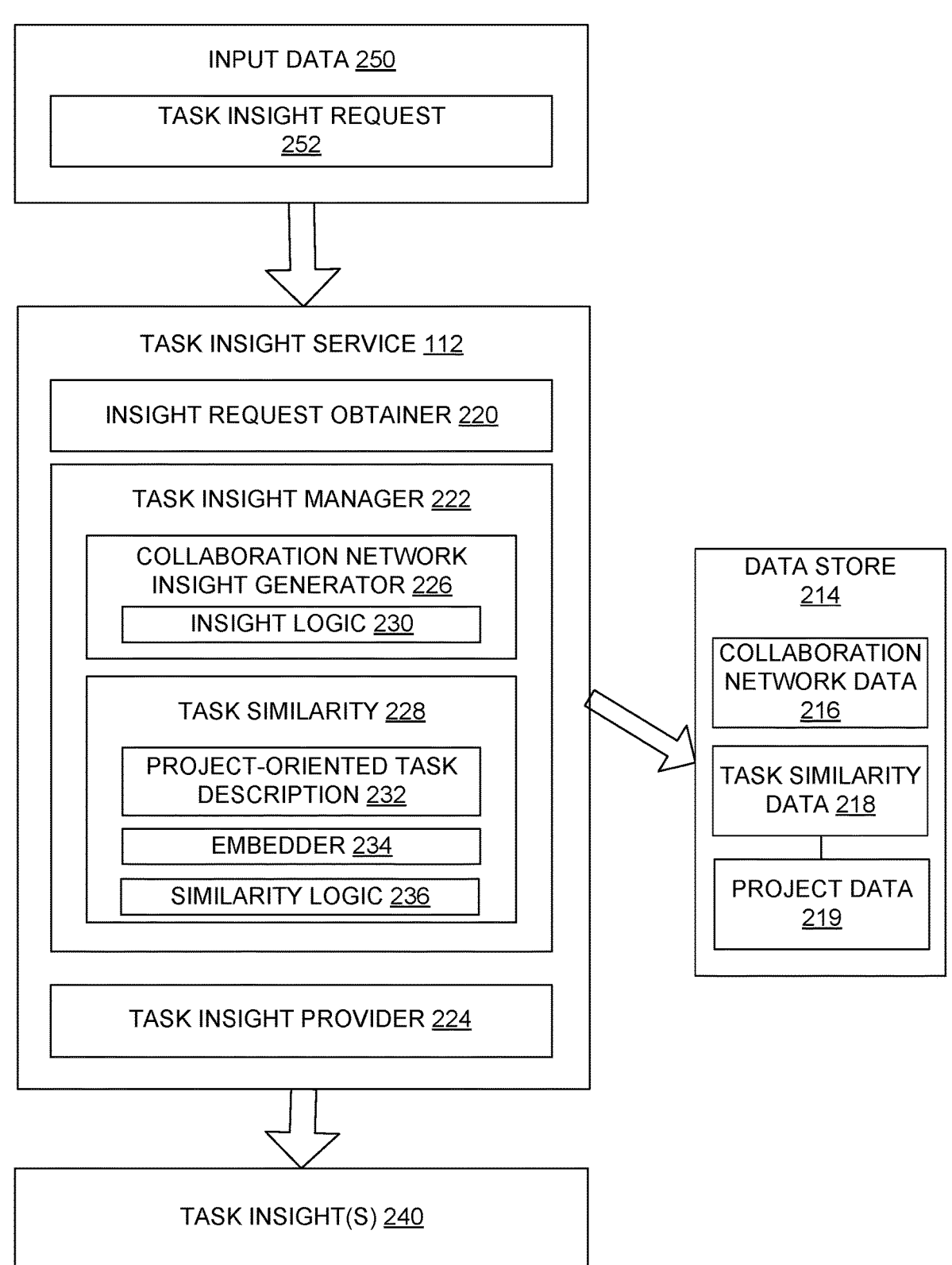
FIG. 2 is an example implementation for facilitating generation of task insights, via a task insight service, in accordance with aspects of the technology described herein.

Turning now to FIG. 2, FIG. 2 illustrates an example implementation for providing task insights, via task insight service 112. The task insight service 112 may communicate with the data store 214. The data store 214 is configured to store various types of information accessible by the task insight service 112 or other server. In embodiments, data sources (such as data sources 116 of FIG. 1), user devices (such as user devices 110 of FIG. 1), and/or task insight service 112 may provide data to the data store 214 for storage, which may be retrieved or referenced by any such component. As such, the data store 214 may store collaboration network data 216, task data 218, project data 219, and/or the like.

In operation, the task insight service 112 is generally configured to generate task insights. In embodiments, the task insight service 112 includes an insight request obtainer 220, a task insight manager 222, and a task insight provider 224. According to embodiments described herein, the task insight service 112 may include any number of other components not illustrated. In some embodiments, one or more of the illustrated components 220, 222, and 224 may be integrated into a single component or may be divided into a number of different components. Components 220, 222, and 224 may be implemented on any number of machines and may be integrated, as desired, with any number of other functionalities or services.

The insight request obtainer 220 may receive or obtain input to initiate generating and/or providing task insights, such as identifying a potential collaborator or potential collaborator group with experience working on tasks that are similar to an active task. The active task may be associated with a user to whom the task insight is provided. The task insight may be provided through a project management interface. Alternatively, the task insight may be provided through a communication interface (e.g., email service) upon determining that an email being viewed or read by the user is related to the active task. The insight request obtainer 220 may obtain input data 250, which may include insight request 252. Such data may be received from any number of devices or components. For example, an insight request 252 may be received from various user devices, such as user device 102 of FIG. 1.

As described, insight requests may be obtained by the insight request obtainer 220. As described, an insight request generally refers to an indication or request to provide a task insight 240. In some cases, an insight request may be provided based on a user selection, at a user device, indicating a desire to view an insight request(s). For example, a user may select an option to view one or more task insights 240 via a graphical user interface provided by a project management software. As one example, a user may right click on a task description and select an interface element that triggers display of a task insight 240 (e.g., via a pop-up menu). Additionally or alternatively, an insight request may be automatically provided. For example, in association with accessing a project management application (e.g., an application for building a project plan), an insight request may automatically be provided by the user device to the task insight service 112 to initiate generation of a task insight(s).

Such insight requests may indicate context for use in determining insight requests. As such, in embodiments, an insight request may include a digital task record for the active task for which the insight is to be generated. The digital task record may include a task identification, task description, task title, task scheduled date, task completion data, task status (e.g., pending, in progress, or complete). The insight request may identify the project associated with the active task.

Although generally described as obtaining insight requests and task attribute indicators associated therewith provided by a user device, in some cases, an insight request (s) may alternatively or additionally be automatically determined (e.g., by the insight request obtainer 220) or provided by another service. For example, assume a project management application is opened on a user device. Based on the project management application being opened or accessed, an insight request may be automatically determined based on one or more tasks being viewed. In particular, an insight request 252 may be generated for each task being displayed that is associated with a user viewing the task. In an aspect, the interface through which the insight request is provided allows a user to assign or initiate assignment of the active task to a potential collaborator identified in the task insight 240.

In one example, a user viewing the task insight selects a potential collaborator or group of potential collaborators (e.g., a working group) identified in the task insight 240. The potential collaborator may then receive a request to accept responsibility for the task. The request may be an email, text, instant message, system notification, application (e.g., project management application) notification, or the like. If the potential collaborator agrees to accept responsibility for the active task through the interface that provided the request (or by navigating to an interface associated with the task management application) then a task record for the task may be updated to show the active task is assigned to the potential collaborator. The user may also receive a notification indicating the responsibility for the task was accepted.

The task insight manager 222 is generally configured to manage generation of one or more task insights. The task insight manager 222 may include a collaboration-network insight generator 226 and a task similarity generator 228. As may be appreciated, any number of components may be used to provide functionality of the task insight manager 222. For example, in some cases, a single component may perform the functionality described in relation to the collaboration-network insight generator 226 and the task similarity generator 228.

The collaboration-network insight generator 226 is generally configured to generate collaboration network insights. The collaboration network insight may be generated by the insight logic 230. The insight logic 230 may comprise a series of rules that return a desired insight. For example, the insight logic 230 may receive the ask insight request 252 and generate insights about the user associated with the insight request 252. A collaboration network insight may take several forms. In one form, the collaboration network insights may indicate a relational distance between a user assigned to an active task and a potential collaborator to be identified in a task insight as having experience working a task that is similar to the active task. The relational distance may be used as a component of a relevance parameter calculated for the potential collaborator to be identified. The relevance parameter may combine multiple factors, such as task similarity and relational distance. If the two users (e.g., the user and a potential collaborator) have collaborated previously, then a first relevance parameter may be assigned. If the two users have not collaborated directly, but have a second order relationship (e.g., have worked with people that have collaborated with the other potential collaborator) then a second relevance parameter may be assigned. The second parameter may be lower than the first parameter. In general, the greater the relational distance, the lower the relevance parameter (where a low relevance parameter correlates to low relevance).

A second form for the collaboration network insight is the identification of a working group. A working group is a group of potential collaborators that work together previously on one or more tasks. In aspects, it may be desirable to first identify a working group when it is known that a working group will be assigned to the active task. After various working groups are identified, the tasks the group has previously completed are compared to the active task. Groups that have completed similar tasks are given a higher relevance. As described, the similarity may be determined by comparing a semantic vector that describes the active task with semantic vectors that described previously performed tasks.

A collaboration network refers to a set of tasks, such as documents, emails, instant messages, and individuals corresponding thereto (e.g., individuals collaborating in association with the tasks by way of creating tasks, modifying tasks, viewing tasks, accessing tasks, etc.). As such, for a particular task, the collaboration-network insight generator 226 may associate a task with a collaboration network. By way of example, for a previously completed task, the collaboration network may be the users that worked on the task and/or project associated with the task. The collaboration network may include users that worked to complete a particular task or group of related tasks, such as those related to the same project.

To identify a collaboration network associated with a particular task, the collaboration-network insight generator 226 may utilize or reference collaboration network data. In this regard, collaboration network data previously generated may be accessed to identify a particular collaboration network associated with a task. In one example, the collaboration-network insight generator 226 may access collaboration network data 216, for example, in data store 214, to identify a collaboration network associated with a task. For instance, a task identifier may be used to lookup or reference a collaboration network to which the task belongs.

As described herein, a collaboration network generally refers to a set of individuals or entities and tasks that are relevant to a user in regards to a particular project-context. For example, all of the content created or communicated in association with a particular project may fall within a particular collaboration network. Collaboration network data includes any data associated with the collaboration network, such as, for example, user identifiers indicating users associated with the collaboration network, task identifiers indicating tasks in the collaboration network, project plans, tasks or data, or metadata, associated therewith, etc.

In some implementations, collaboration network data 216 includes various collaboration networks. A collaboration network may group entities (e.g., users) based on common features. For example, a group of users that have worked on a single project together may form a cluster. A single user could be in multiple clusters. Collaboration networks may be data generated and stored in any number of ways. Various digital records may be analyzed to identify entities that should be grouped together. In one embodiment, a user's tasks, or activities associated therewith (e.g., receiving, accessing, sending, creating, modifying, deleting, viewing, attending, organizing, setting, monitoring, etc.), the people associated with the tasks, and the content associated with the activities are automatically inferred or detected based on the channels of collaboration associated with the activities, such as electronic mail, instant messages, documents, meetings, and the like. For instance, artificial intelligence or one or more machine learning mechanisms (e.g., models, algorithms, or applications) are used to infer the user's tasks, the people associated with the tasks, and the content associated with the tasks. Some or all of this data is analyzed to determine one or more collaboration networks the user has focused on over a period of time. Such collaboration networks may be determined or updated in real-time, in substantially real-time, at predefined interfaces (e.g., once a week), or on demand. As such, as activities, people, and content the user focuses on change over time, the collaboration networks change as well.

Figure 3:
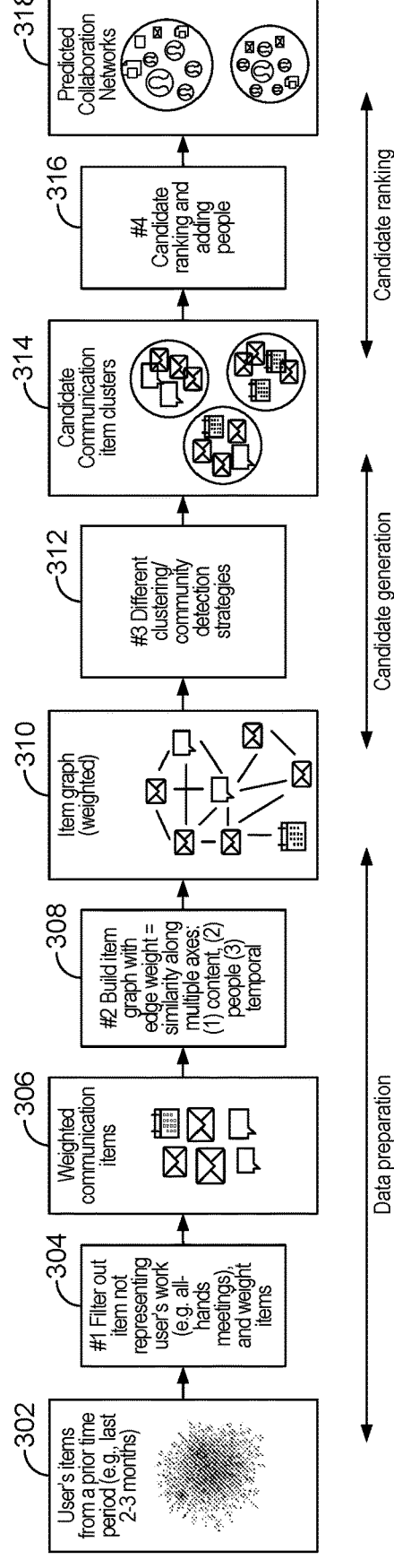
FIG. 3 is an example implementation for facilitating generation of a collaboration network, in accordance with aspects of the technology described herein.

One example implementation 300 for determining or inferring collaboration networks is provided in FIG. 3. Initially, tasks from a prior time period are collected, as shown at 302. Each task is associated with a user. For example, tasks, such as communication tasks, associated with a user may be collected from the last two to three months or several years. At 304, tasks identified as not representing the user's work are removed or filtered from the collected tasks, and the remaining tasks are weighted. For instance, tasks associated with meetings that do not represent the user's work may be filtered from the collected task. The remaining tasks may then be weighted, as illustrated at 306. For a project-oriented collaboration graph, only tasks related to a project are considered. Tasks may be related to a project via a semantic analysis. For example, a document may include the name of a project.

At block 308, a task graph is generated. In embodiments, the task graph includes an edge weight approximately equal to similarity along multiple axes, such as content, people, and temporal. For instance, in FIG. 3, task graph 310 is generated. At 312, different clustering and/or communication detection strategies are applied. As such, candidate task clusters, such as communication task clusters, are created, as shown at 314. Thereafter, at 316, candidate ranking is performed along with identifying entities or individuals associated with such task clusters. Because the tasks are determined to be related, it may be inferred that the users working on those tasks are collaborators. In this manner, predicted collaboration networks are generated, as shown at 318. As may be appreciated, various technologies may be used to perform such a process. For instance, unsupervised clustering algorithms may be used. As one example, an unsupervised cluster algorithm with hyperparameter tuning from ground truths may be used. Using such an approach, evaluation may be performed based on manually constructed ground truth collaboration networks. In other implementations, embeddings associated with 308 and 312 may be leveraged and/or supervised methods may be used.

Various logic may be used to build the collaboration network. For example, logic may comprise a statistical model, fuzzy logic, neural network, finite state machine, support vector machine, logistic regression, clustering, or machine-learning techniques, similar statistical classification processes, or combinations of these to identify tasks of interest.

Tasks for which to identify collaboration networks may be identified in any number of ways. As one example, a task(s) of interest may be determined based on a date/time associated with a task. For instance, any tasks with a status or state change (within a threshold time or number of tasks) may be identified. By way of example only, any documents generated or modified within the past week may be identified as a task of interest. As another example, a task with any modification may be identified (e.g., a modification within a threshold time, such as the past week; a number of modifications, such as more than one modification; modifications by more than one individual or entity; etc.). A status change, state change, and/or modification may be used herein to refer to any alterations associated with a task, such as, for example, an edit to the task, a comment associated with the task, a response associated with the task, a view associated with the task, etc. Any state, status, or modification change may be identified in any number of ways, such as by accessing a data source (e.g., data source 116 of FIG. 1) containing such information. Such data sources may include a data source associated with a collaboration network data, a data source associated with task data (e.g., a data source hosting documents, a data source hosting electronic communications), or the like.

The task similarity generator 228 identifies similar tasks. The task similarity generator 228 includes a project-oriented task description generator 232, a language model 234, and similarity logic 236. The project-oriented task description generator 232 builds a project-context oriented task description. The project-oriented task description includes the task description of the active task along with additional descriptions for other elements in the project. The other elements may be other tasks, overall project descriptions, project titles, project goals, and the like. Various selection methodologies may be used to identify task descriptions to include within the project-oriented task description. In general, task descriptions higher in the task hierarchy than the active task may be included. In an aspect, all task descriptions in the direct hierarchy above an active task are included within the project-oriented task description. In other aspects, task descriptions of tasks on the same hierarchical level as the active task may be included in the project-oriented text description. In another aspect, all second-level tasks within the project are included in the project-oriented task description.

Various selection methods may be combined until a threshold number of descriptions are added to the project-oriented task description. For example, the threshold number maybe ten descriptions. In this example, the first four descriptions may be task descriptions from tasks in the direct hierarchical chain leading from the active task to the root task. Three additional tasks descriptions may be taken from tasks that have a time sequence connection to a task in the hierarchical chain. The three remaining tasks may be taken from the same level as the active task to complete the ten tasks.

The language model 234 uses the project-oriented task description to generate an embedding that represents a meaning of the project-oriented task description in a data structure, such as a vector. The embedding of the project-oriented task description may be described as a task embedding herein. The language model 234 may take the form of a machine-learned model. In aspects, the embedding is generated using a sentence-embedding model. The embedding for the active task may then be compared to the embedding of other tasks using a similarity parameter, such as cosine similarity. A sentence-embedding model maps a sentence onto a numerical vector. The embedding attempts to capture the semantic content of the text in the project-oriented task description. If two project-oriented task descriptions express a similar idea using different words, their representations (embedding vectors) should still be similar to each other. Various categories of sentence embedding techniques may be used, such as bag-of-word (BoW), models that are based on aggregating embeddings for the individual words in a sentence, and models that build a representation for a full sentence. Example sentence embedding models include BERT (Bidirectional Encoder Representations from Transformers), Doc2Vec, SBERT (sentence BERT), InferSent, and the Universal Sentence Encoder.

The similarity logic 236 identifies tasks that are similar to an active task using the embedding representing the tasks being compared. In one aspect, a group of tasks that are similar to an active task are identified by comparison of embeddings. In another aspect, the task and an associated similarity parameter is output from the similarity logic. A group of similar tasks may be identified using a nearest neighbor index. In an aspect, a nearest neighbor index is built that includes vector embeddings for tasks within a plurality of projects. The projects may be taken from project data 219 generated by a project management software. The plurality of projects may be associated with an organization, such as a business.

The nearest neighbor index may be built using a nearest neighbor algorithm, such as the k-nearest neighbor algorithm, also known as KNN or k-NN. In an aspect, a group of tasks that are similar to an active task may be retrieved by finding the most similar individual task and then taking a threshold amount of the nearest tasks from the nearest neighbor index. For example, the similarity logic 236 may identify the top 100 most similar tasks to an active task. These may be output to the task insight provider 224, which then ranks the 100 similar tasks by relevance using various factors, such as the relational distance between a task performer and the task associated with the active task. The goal of the relevant parameter is to identify the potential collaborator with the most relevant expertise that is also likely able and willing to help the user associated with the active project. In addition to relational distance, position in an organizational chart, office location (e.g., city), the recency of task performance, and other factors may be used to determine relevance. Each factor may be weighted differently. The most relevant potential collaborator may be included within a task insight sent to the user associated with the active project.

In a different aspect, the similarity logic 236 may output a similarity parameter for each task. For example, each task performed by a potential collaborator group being considered as a working group may receive a similarity parameter. The similarity parameters assigned to tasks performed by the working group may be combined to form a relevance parameter for the working group. In general, the more similar the tasks and the more recently the task were performed the more relevant the working group.

The task insight 240, which may identify one or more potential collaborators for an active task, is then provided to a user associated with the task insight request 252. As previously described, the task insight request may be generated without user input or in response to a request provided through a user interface, such as may be provided by a project management application. The task insight 240 may include an interface element that allows the user to assign or initiate assignment of the active task to a potential collaborator or working group identified in the task insight 240.

The task insight 240 may also display information used to select a potential collaborator. For example, descriptions of one or more relevant tasks previously performed by the potential collaborator may be included in the task insight 240. The relevant tasks previously performed may be those most similar to the active task, as determined by the similarity logic 236. The description of tasks allows the viewer to confirm whether the potential collaborator has experience that may be useful for completion of the active task.

Figure 4:
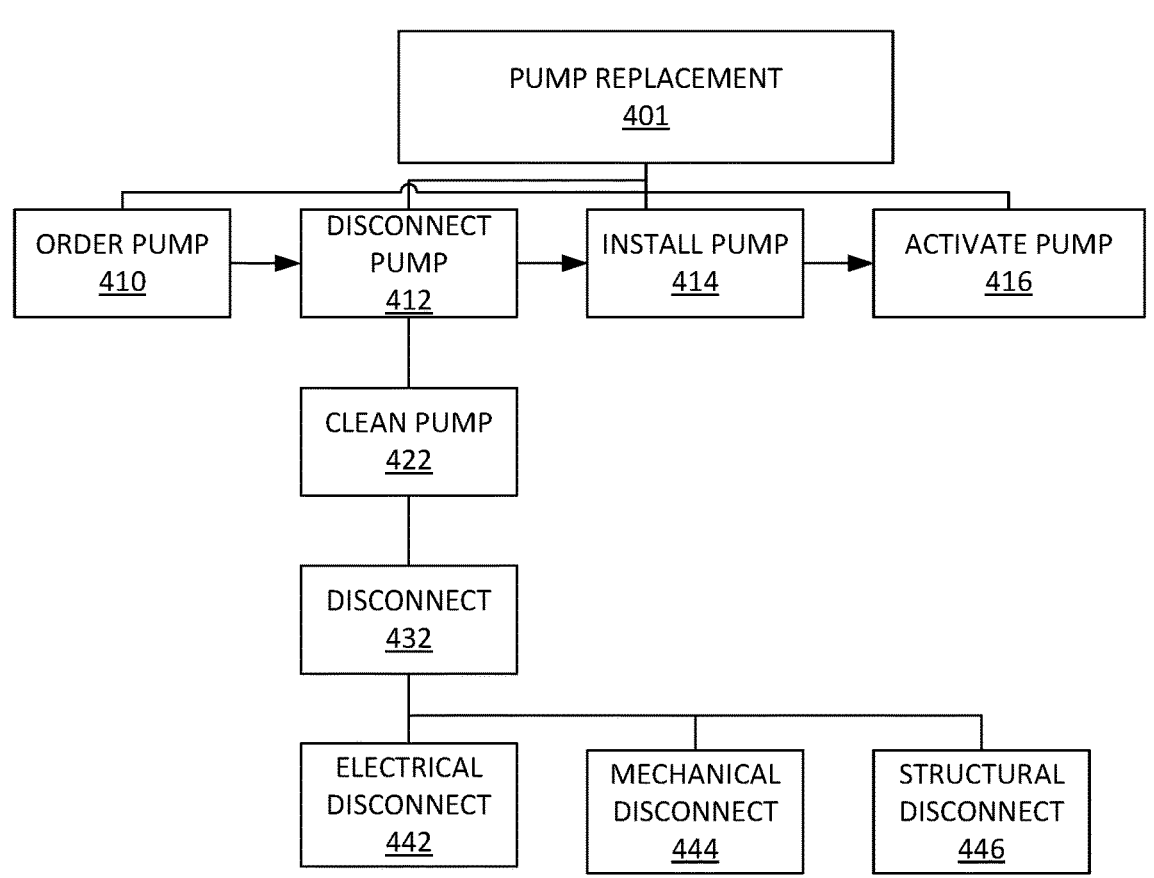
FIG. 4 provides an example of task dependencies within a project, in accordance with embodiments of the present technology.

Turning now to FIG. 4, select tasks within an example project plan 400 are shown. As can be seen, the project plan 400 describes tasks to be performed in order to replace a pump, such as a water pump. The project plan includes a pump replacement task 401 at hierarchical level 1, which could also be described as the root task. Level 2 includes an order pump task 410, an disconnect pump task 412, a install pump task 414, and activate pump task 416. The subtasks under the disconnect pump task 412 include the clean the pump task 422 and the disconnect pump task 432. Subtasks of the disconnect pump task 432 include the electrical disconnect task 442, the mechanical disconnect task 444, and the structural disconnect task 446.

The tasks in project plan 400 are shown with their titles. Each task may also include a task description, a scheduled completion date, and one or more users associated with the task. The one or more users may be related to the task in different ways. For example, one user may have ownership or responsibility for the task. Another user may be listed as the task supervisor. Other relationships are possible. The role may be considered when determining the relevance of a user to an active task associated with a different user. In particular, a user in the same role with relation to a similar task as the user to which a task insight is to be presented may be given higher relevance. Conversely, a user in a different role may be given less relevance.

The tasks in project plan 400 illustrate various dependencies. The dependencies include hierarchical dependencies and time sequence dependencies. The dependencies may be explicitly defined within the project plan. The hierarchical dependencies are illustrated by the level on which the task is shown with the first level being at the top and leaf nodes progressing downward. The time sequence dependencies are illustrated by the arrows. Within the plan, the order pump task 410 must precede the disconnect pump task 412. Similarly, the disconnect pump task 412 must precede the install pump task 414. Finally, the test pump task 414 precedes the activate pump task 416. A subtask shares the time sequence dependency of the subtask's parent task.

As described, various implementations can be used in accordance with embodiments described herein. FIGS. 5-7 provide methods of facilitating providing task insights, in accordance with embodiments described herein. The methods 500, 600, and 700 can be performed by a computer device, such as device 800 described below. The flow diagrams represented in FIGS. 5-7 are intended to be examples and not limiting.

Turning initially to method 500 of FIG. 5, a method 500 is directed to generating and providing task insights, in accordance with embodiments of the present technology. At step 510, the method 500 includes, obtaining from a project management program, a digital task record for an active task to be completed as part of a project. The digital task record is associated with a user and has a plurality of features including a textual task description. The project management program may be a project management application operating on a user device and/or a project management service operating in a data center. In the instance of a service, a user interface associated with the service is presented on the user device of the user. The service may receive interactions from the user through the user interface and provide information. The digital task record may be provided as part of a task insight request. The digital task record may reside in computer storage and be associated with the project record. The task insight request may be generated in response to various triggers. In one aspect, the trigger is an explicit user instruction. The explicit user instruction may request a user with experience to help on and active task. A different user instruction may request a working group to complete the task or assist with the task. The trigger may also be implicit, which does not require any user interaction. For example, the user may be viewing an interface related to the active task may trigger the generation of a task insight. Such an interface may include a task view with in project management software. However, an interface related to the active task could include a calendar application showing a meeting related to the task or a communication application showing a message related to the task. The message or meeting may be related to the task through content in the message or meeting, such as a project title associated with the active task, task description, and the like. The type of task generated by an implicit trigger may depend on the status of the active task, the role of the user associated with the task, and other factors. For example, if the task is already assigned to the user, then a task insight to find a user with expertise to help may be requested. If the task is unassigned, and the person viewing the task typically assigns tasks to others, then a working group insight may be requested.

At step 520, the method 500 includes obtaining, from the computer storage associated with the project management program, additional descriptions from other elements in the project. The other elements may be other tasks, overall project descriptions, project titles, project goals, and the like. Various selection methodologies may be used to identify task descriptions to include within the project-oriented task description. In general, task descriptions higher in the task hierarchy than the active task may be included. In an aspect, all task descriptions in the direct hierarchy above an active task are included within the project-oriented task description. In other aspects, task descriptions of tasks on the same hierarchical level as the active task may be included in the project-oriented text description. In another aspect, all second-level tasks within the project are included in the project-oriented task description.

At step 530, the method 500 includes, combining text from the textual task description with addition text from the additional descriptions to form a project-oriented task description for the active task. The project-oriented task description includes the task description of the active task along with additional descriptions for other elements in the project. The combination may be in the form of unstructured text and/or a mixture of structured text and unstructured task. For example, the textual task description may be in the form of a sentence or paragraph. The additional text from other elements could be keywords, which are unstructured. The additional text could also be task descriptions from other tasks in the project, which is structured.

At step 540, the method 500 includes, generating, by a language model, a task embedding for the active task using the project-oriented task description. The task embedding may be generated using a sentence embedding technology or model, such as BERT or SVERT.

At step 550, the method 500 includes, calculating a plurality of semantic similarity parameters using the task embedding and a plurality of task embeddings associated with a plurality of other tasks. The semantic similarity parameter may be generated using cosine similarity or other method of quantifying a similarity between embeddings.

At step 560, the method 500 includes, identifying a plurality of tasks within a threshold semantic similarity to the task embedding by comparing the task embedding to task embeddings associated with the plurality of tasks. The task embeddings associated with the plurality of tasks may be generated from project-oriented task descriptions for those tasks. Each of the plurality of tasks is associated with one or more potential collaborators. The potential collaborators may be associated with a task via metadata associated with a digital task record.

At step 570, the method 500 includes, calculating a relevance parameter for the one or more potential collaborators. The relational distance may be used as a component of a relevance parameter calculated for the potential collaborators to be identified. The relevance parameter may combine multiple factors, such as task similarity and relational distance. If the two uses (e.g. the user and a potential collaborator) have collaborated previously, then a first relevance parameter may be assigned. If the two users have not collaborated directly, but have a second order relationship (e.g., have worked with people that have collaborated with the other user) then a second relevance parameter may be assigned. The second parameter may be lower than the first parameter. In general, the greater the relational distance, the lower the relevance parameter (where a low relevance parameter correlates to low relevance). Other relevance factors include the elapsed time since users have worked together. Relevance parameters may increase as the elapsed time decreases. In others, potential collaborators who have collaborated recently may be given a higher relevance parameter.

At step 580, the method 500 includes, identifying a potential collaborator from the one or more users based on the relevance parameter. The task insight may also include information about the tasks performed by the group. The information about the task may include a title of a task, a description of a task, the date the task was completed, the project the task was a part of, and other information.

At step 590, the method 500 includes, providing a task insight comprising identification information for the potential collaborator to the user. The task insight may be provided to a user viewing a task in the project management application. As previously described, the task insight request may be generated without user input or in response to a request provided through a user interface, such as may be provided by the project management application. The task insight may include an interface element that allows the user to assign or initiate assignment of the active task to a potential collaborator or working group identified in the task insight.

The task insight may also display information used to select a potential collaborator. For example, descriptions of one or more relevant tasks previously performed by the potential collaborator may be included in the task insight. The relevant tasks previously performed may be those most similar to the active task. The description of tasks allows the viewer to confirm whether the potential collaborator has experience that may be useful for completion of the active task.

Turning initially to method 600 of FIG. 6, a method 600 is directed to generating and providing task insights, in accordance with embodiments of the present technology. At step 610, the method 600 includes, obtaining a digital task record for an active task to be completed as part of a project. The digital task record is associated with a user and has a plurality of features including a textual task description. The digital task record may be provided as part of a task insight request. The task insight request may be generated in response to various triggers. In one aspect, the trigger is an explicit user instruction. The explicit user instruction may request a user with experience to help on and active task. A different user instruction may request a working group to complete the task or assist with the task. The trigger may also be implicit, which does not require any user interaction. For example, the user may be viewing an interface related to the active task may trigger the generation of a task insight. Such an interface may include a task view with in project management software. However, an interface related to the active task could include a calendar application showing a meeting related to the task or a communication application showing a message related to the task. The message or meeting may be related to the task through content in the message or meeting, such as a project title associated with the active task, task description, and the like. The type of task generated by an implicit trigger may depend on the status of the active task, the role of the user associated with the task, and other factors. For example, if the task is already assigned to the user, then a task insight to find a potential collaborator with expertise to help may be requested. If the task is unassigned, and the person viewing the task typically assigns tasks to others, then a working group insight may be requested.

At step 620, the method 600 includes, identifying, from a collaboration network, a plurality of working groups that have worked together in the past. The collaboration network is a data structure representing users and relationships between users formed by association with common task data. The task data could be a document, email, meeting record or other data that may be associated with a user. Task data may be associated with a user through content, such a document or email that includes identification information for a user. Task data may be associated with a user through user interactions, such as reading, editing, saving, or creating a document. A computer model may be used to analyze user associations with task data to identify working relationships between users. Conceptually, the more two or more users are associated with the same task data the more likely they are to be identified as working together to form a working group. The model training may be used to define a threshold amount and quality of task associations in common required to recognize a relationship between users.

Related tasks may form a project. In aspects, the collaboration network is a project-oriented collaboration network. The project-oriented collaboration network looks not just at whether users are associated with the same tasks, but whether various tasks are part of the same project. Users that work on different tasks that are part of the same project may be recognized as having a working relationship that would not otherwise be apparent apart from the project context.

At step 630, the method 600 includes, for each working group, determining from historic-task records, one or more tasks with which a working group is associated. Potential collaborators in the working group may be linked to tasks via associations with the task records. The working group may be associated with a task or project when one or more potential collaborators in the group is associated with the task or project.

At step 640, the method 600 includes, for each working group, determining a similarity parameter to measure a similarity between the active task and the one or more tasks.

The similarity parameter may be generated by comparing an embedding vector representing the active task within betting vectors representing the one or more tasks. In an aspect, cosine similarity is used to generate the similarity parameter.

At step 650, the method 600 includes, providing a task insight to a user associated with the active task, the task insight including identification for a working group with above a threshold similarity to the active task. The above a threshold similarity may be based on the most similar single task performed by the working group or a similarity derived from a combination of tasks. The task insight may describe multiple working groups with above the threshold similarity. The task insight may also include information about the tasks performed by the working group. The information about the task may include a title of a task, a description of a task, the date the task was completed, the project the task was a part of, and other information.

As an alternative, if no working group has above a threshold similarity, then the working group with the highest similarity may be provided.

The task insight may be provided to a user viewing a task in the project management application. As previously described, the task insight request may be generated without user input or in response to a request provided through a user interface, such as may be provided by the project management application. The task insight may include an interface element that allows the user to assign or initiate assignment of the active task to a potential collaborator or working group identified in the task insight.

The task insight may also display information used to select a potential collaborator. For example, descriptions of one or more relevant tasks previously performed by the potential collaborator may be included in the task insight. The relevant tasks previously performed may be those most similar to the active task. The description of tasks allows the viewer to confirm whether the potential collaborator has experience that may be useful for completion of the active task.

Turning initially to method 700 of FIG. 7, a method 700 is directed to generating and providing task insights, in accordance with embodiments of the present technology. At step 710, the method 700 includes, obtaining from a project management program, a digital task record for an active task to be completed as part of a project. The digital task record is associated with a user and has a plurality of features including a textual task description. The project management program may be a project management application operating on a user device and/or a project management service operating in a data center. In the instance of a service, a user interface associated with the service is presented on the user device of the user. The service may receive interactions from the user through the user interface and provide information. The digital task record may be provided as part of a task insight request. The digital task record may reside in computer storage and be associated with the project record. The task insight request may be generated in response to various triggers. In one aspect, the trigger is an explicit user instruction. The explicit user instruction may request a potential collaborator with experience to help on and active task. A different user instruction may request a working group to complete the task or assist with the task. The trigger may also be implicit, which does not require any user interaction. For example, the user may be viewing an interface related to the active task may trigger the generation of a task insight. Such an interface may include a task view with in project management software. However, an interface related to the active task could include a calendar application showing a meeting related to the task or a communication application showing a message related to the task. The message or meeting may be related to the task through content in the message or meeting, such as a project title associated with the active task, task description, and the like. The type of task generated by an implicit trigger may depend on the status of the active task, the role of the user associated with the task, and other factors. For example, if the task is already assigned to the user, then a task insight to find a potential collaborator with expertise to help may be requested. If the task is unassigned, and the person viewing the task typically assigns tasks to others, then a working group insight may be requested.

At step 720, the method 700 includes obtaining, from the computer storage associated with the project management program, additional descriptions from other elements in the project. The other elements may be other tasks, overall project descriptions, project titles, project goals, and the like. Various selection methodologies may be used to identify task descriptions to include within the project-oriented task description. In general, task descriptions higher in the task hierarchy than the active task may be included. In an aspect, all task descriptions in the direct hierarchy above an active task are included within the project-oriented task description. In other aspects, task descriptions of tasks on the same hierarchical level as the active task may be included in the project-oriented text description. In another aspect, all second-level tasks within the project are included in the project-oriented task description.

At step 730, the method 700 includes, combining text from the textual task description with addition text from the additional descriptions to form a project-oriented task description for the active task. The project-oriented task description includes the task description of the active task along with additional descriptions for other elements in the project. The combination may be in the form of unstructured text and/or a mixture of structured text and unstructured task. For example, the textual task description may be in the form of a sentence or paragraph. The additional text from other elements could be keywords, which are unstructured. The additional text could also be task descriptions from other tasks in the project, which is structured.

At step 740, the method 700 includes, generating, by a language model, a task embedding for the active task using the project-oriented task description. The task embedding may be generated using a sentence embedding technology or model, such as BERT or SVERT.

At step 750, the method 700 includes, identifying, from a collaboration network, a plurality of working groups that have worked together in the past.

At step 760, the method 700 includes, for each working group, determining from historic-task records, one or more tasks with which a working group is associated. Users may be linked to tasks via associations in the task records.

At step 770, the method 700 includes, comparing the task embedding to task embeddings associated with the one or more tasks to generate a group similarity parameter that quantifies a similarity between the active task and the one or more tasks. The task embeddings associated with the plurality of tasks may be generated from project-oriented task descriptions for those tasks. Each of the plurality of tasks is associated with one or more users. The users may be associated with a task via metadata associated with a digital task record.

At step 780, the method 700 includes, identifying a potential working group from the plurality of working groups based on the group similarity parameter.

At step 790, the method 700 includes, providing a task insight comprising identification information for the potential working group. The task insight may also include information about the tasks performed by the working group. The information about the task may include a title of a task, a description of a task, the date the task was completed, the project the task was a part of, and other information. The task insight may be provided to a user viewing a task in the project management application. As previously described, the task insight request may be generated without user input or in response to a request provided through a user interface, such as may be provided by the project management application. The task insight may include an interface element that allows the user to assign or initiate assignment of the active task to a potential collaborator or working group identified in the task insight.

The task insight may also display information used to select a potential collaborator. For example, descriptions of one or more relevant tasks previously performed by the potential collaborator may be included in the task insight. The relevant tasks previously performed may be those most similar to the active task. The description of tasks allows the viewer to confirm whether the potential collaborator has experience that may be useful for completion of the active task.

Overview of Example Operating Environment

Having briefly described an overview of aspects of the technology described herein, an example operating environment in which aspects of the technology described herein may be implemented is described below in order to provide a general context for various aspects of the technology described herein.

Figure 8:
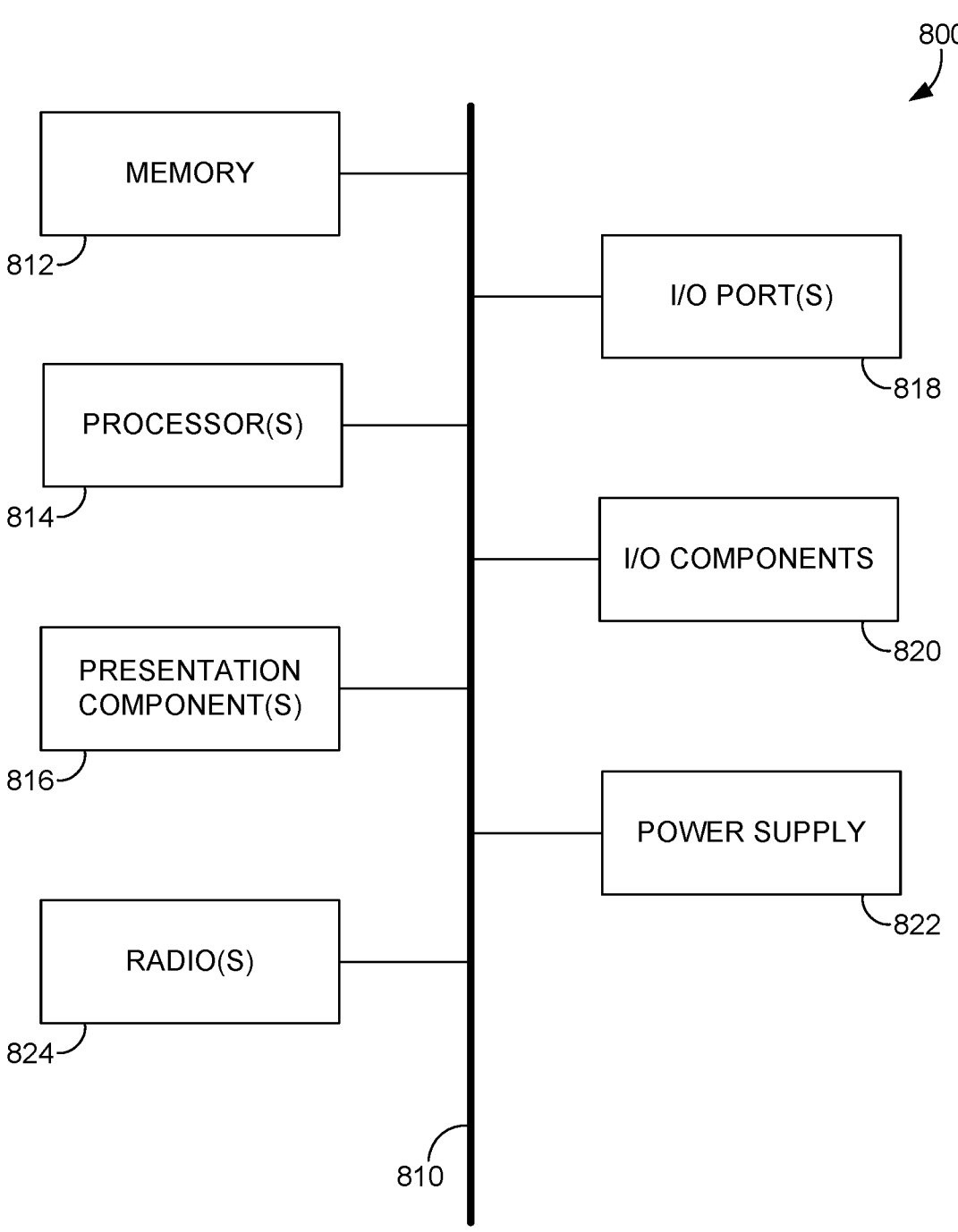
FIG. 8 is a block diagram of an example computing environment suitable for use in implementing aspects of the technology described herein.

Referring to the drawings in general, and to FIG. 8 in particular, an example operating environment for implementing aspects of the technology described herein is shown and designated generally as computing device 800. Computing device 800 is just one example of a suitable computing environment and is not intended to suggest any limitation as to the scope of use or functionality of the technology described herein. Neither should the computing device 800 be interpreted as having any dependency or requirement relating to any one or combination of components illustrated.

The technology described herein may be described in the general context of computer code or machine-usable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the technology described herein may be practiced in a variety of system configurations, including handheld devices, consumer electronics, general-purpose computers, and specialty computing devices. Aspects of the technology described herein may also be practiced in distributed computing environments where tasks are performed by remote-processing devices that are linked through a communications network.

With continued reference to FIG. 8, computing device 800 includes a bus 810 that directly or indirectly couples the following devices: memory 812, one or more processors 814, one or more presentation components 816, input/output (I/O) ports 818, I/O components 820, an illustrative power supply 822, and a radio(s) 824. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 8 is merely illustrative of an example computing device that may be used in connection with one or more aspects of the technology described herein. Distinction is not made between such categories as "workstation," "server," "laptop," and "handheld device," as all are contemplated within the scope of FIG. 8 and refer to "computer" or "computing device."

Computing device 800 typically includes a variety of computer-readable media. Computer-readable media can be any available media that can be accessed by computing device 800 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program sub-modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage, or other magnetic storage devices. Computer storage media does not comprise a propagated data signal.

Communication media typically embodies computer-readable instructions, data structures, program sub-modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 812 includes computer storage media in the form of volatile and/or nonvolatile memory. The memory 812 may be removable, non-removable, or a combination thereof. Example memory includes solid-state memory, hard drives, and optical-disc drives. Computing device 800 includes one or more processors 814 that read data from various entities such as bus 810, memory 812, or I/O components 820. Presentation component(s) 816 present data indications to a user or other device. Example presentation components 816 include a display device, speaker, printing component, and vibrating component. I/O port(s) 818 allow computing device 800 to be logically coupled to other devices including I/O components 820, some of which may be built in.

Illustrative I/O components include a microphone, joystick, game pad, satellite dish, scanner, printer, display device, wireless device, a controller (such as a keyboard, and a mouse), a natural user interface (NUI) (such as touch interaction, pen (or stylus) gesture, and gaze detection), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 814 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may be coextensive with the display area of a display device, integrated with the display device, or may exist as a separate device overlaying or otherwise appended to a display device. Any and all such variations, and any combination thereof, are contemplated to be within the scope of aspects of the technology described herein.

A NUI processes air gestures, voice, or other physiological inputs generated by a user. Appropriate NUI inputs may be interpreted as ink strokes for presentation in association with the computing device 800. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 800. The computing device 800 may be equipped with depth cameras, such as stereoscopic camera systems, infrared camera systems, RGB camera systems, and combinations of these, for gesture detection and recognition. Additionally, the computing device 800 may be equipped with accelerometers or gyroscopes that enable detection of motion. The output of the accelerometers or gyroscopes may be provided to the display of the computing device 800 to render immersive augmented reality or virtual reality.

A computing device may include radio(s) 824. The radio 824 transmits and receives radio communications. The computing device may be a wireless terminal adapted to receive communications and media over various wireless networks. Computing device 800 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

The technology described herein has been described in relation to particular aspects, which are intended in all respects to be illustrative rather than restrictive.

What is claimed is:

1. A computing system comprising:
   a processor; and
   computer storage memory having computer-executable instructions stored thereon which, when executed by the processor, configure the computing system to:

receive, from a device associated with a user, an automatically generated request for a task insight related to an active task;
   obtain, from computer storage associated with a project management program, a digital task record for the active task to be completed as part of a project, the digital task record associated with the user assigned to the active task and including a textual task description;
   obtain, from the computer storage associated with the project management program, additional descriptions from other elements in the project;
   combine text from the textual task description with addition text from the additional descriptions to form a project-oriented task description for the active task;
   generate, by a language model, a task embedding for the active task using the project-oriented task description;
   determine a plurality of semantic similarity parameters using the task embedding and a plurality of task embeddings associated with a plurality of other tasks;
   identify a plurality of tasks within a threshold semantic similarity to the task embedding using the plurality of semantic similarity parameters, wherein each of the plurality of tasks is associated with one or more potential collaborators;
   determine a relevance parameter for the one or more potential collaborators, wherein a factor in the relevance parameter is a relational distance between the user assigned to the active task and the one or more potential collaborators;
   identify a potential collaborator from the one or more potential collaborators based on the relevance parameter; and
   provide a task insight comprising identification information for the potential collaborator to the user assigned to the active task.

2. The computing system of claim 1, wherein the relational distance is related to whether the user assigned to the active task and the potential collaborators have worked together.

3. The computing system of claim 1, wherein a factor in the relevance parameter is an elapsed time since the potential collaborator completed an individual task within the plurality of tasks.

4. The computing system of claim 1, wherein a factor in the relevance parameter is an amount of tasks within the plurality of tasks that are associated with the potential collaborator.

5. The computing system of claim 1, wherein the language model uses a sentence embedding technique to generate the task embedding.

6. The computing system of claim 1, wherein the other elements are tasks in the project that share a dependency with the active task within the project.

7. The computing system of claim 6, wherein the dependency is hierarchical and the tasks in the project are in a higher hierarchical level than the active task.

8. The computing system of claim 1, wherein the task insight is generated without a user query or request.

9. A computer-implemented method comprising:
   receiving, from a device associated with a user, an automatically generated request for a task insight related to an active task;
   obtaining, from computer storage associated with a project management program, a digital task record for the active task to be completed as part of a project, the digital task record associated with a textual task description;

identifying, from a collaboration network, a plurality of working groups that have worked together previously, wherein the collaboration network is a data structure representing users and relationships between users formed by association with common task data wherein the collaboration network is a project-oriented collaboration network that considers collaboration between users on different tasks within an identified project;

for each working group, determining from historic-task records, one or more tasks with which a working group is associated;

for each working group, determining a similarity parameter that is a measure of similarity between the active task and the one or more tasks; and providing a task insight to the user associated with the active task, the task insight including identification for a working group with above a threshold similarity to the active task.

10. The method of claim 9, further comprising:

obtaining, from the computer storage associated with the project management program, additional descriptions from other elements in the project;

combining text from the textual task description with addition text from the additional descriptions to form a project-oriented task description for the active task;

generating, by a language model, a task embedding for the active task using the project-oriented task description;

generating the similarity parameter by comparing the task embedding to task embeddings associated with the one or more tasks.

11. The method of claim 10, wherein the language model uses a sentence embedding technique to generate the task embedding.

12. The method of claim 10, wherein the other elements are tasks in the project that share a dependency with the active task within the project.

13. The method of claim 12, wherein the dependency is hierarchical and the tasks in the project are in a higher hierarchical level than the active task.

14. The method of claim 12, wherein the dependency is time-sequence and the tasks in the project are scheduled for completion before the active task.

15. The method of claim 9, wherein the method further comprises building a project graph where edges in the graph include a weight that indicates a strength of similarity between items is a project-oriented collaboration network.

16. One or more computer storage media having computer-executable instructions embodied thereon that, when executed by one or more processors, cause the one or more processors to perform a method, the method comprising:

receiving, from a device associated with a user, an automatically generated request for a task insight related to an active task;

obtaining, from computer storage associated with a project management program, a digital task record for the active task to be completed as part of a project, the digital task record associated with a user and including a textual task description;

obtaining, from the computer storage associated with the project management program, additional descriptions from other elements in the project wherein the other elements are tasks in the project that share a dependency with the active task within the project;

combining text from the textual task description with addition text from the additional descriptions to form a project-oriented task description for the active task;

generating, by a language model, a task embedding for the active task using the project-oriented task description;

identifying, from a collaboration network, a plurality of working groups that have worked together previously;

for each working group, determining from historic-task records, one or more tasks with which a working group is associated;

comparing the task embedding to task embeddings associated with the one or more tasks to generate a group similarity parameter that quantifies a similarity between the active task and the one or more tasks;

identifying a potential working group from the plurality of working groups based on the group similarity parameter; and providing a task insight comprising identification information for the potential working group.

17. The media of claim 16, wherein the other elements are tasks in the project that share a dependency with the active task within the project.

18. The media of claim 17, wherein the dependency is hierarchical and the tasks in the project are in a higher hierarchical level than the active task.

19. The media of claim 16, wherein the collaboration network is a project-oriented collaboration network that considers collaboration between users on different tasks within an identified project.

20. The media of claim 16, wherein the language model uses a sentence embedding technique to generate the task embedding.

* * * * *